(12) United States Patent
Kummetz

(10) Patent No.: US 8,693,945 B2
(45) Date of Patent: Apr. 8, 2014

(54) SYSTEM AND METHOD FOR DETECTING AND MEASURING UPLINK TRAFFIC IN SIGNAL REPEATING SYSTEMS

(71) Applicant: Andrew LLC, Hickory, NC (US)

(72) Inventor: Thomas Kummetz, Kissing (DE)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/693,821

(22) Filed: Dec. 4, 2012

(65) Prior Publication Data

US 2013/0095749 A1  Apr. 18, 2013

Related U.S. Application Data

(63) Continuation of application No. 12/778,312, filed on May 12, 2010, now Pat. No. 8,346,160.

(51) Int. Cl.
  H04B 7/15 (2006.01)
  H04B 3/36 (2006.01)
  H04B 1/60 (2006.01)
  H04B 7/14 (2006.01)

(52) U.S. Cl.
  USPC ............. 455/11.1; 455/7; 455/9; 455/15

(58) Field of Classification Search
  USPC ................. 455/11.1, 7, 9, 15.16
  See application file for complete search history.

(56) References Cited

U.S. PATENT DOCUMENTS

| | | | |
|---|---|---|---|
| 4,901,307 A * | 2/1990 | Gilhousen et al. | 370/320 |
| 4,903,321 A | 2/1990 | Hall et al. | |
| 4,941,200 A | 7/1990 | Leslie et al. | |
| 5,023,930 A | 6/1991 | Leslie | |
| 5,073,972 A | 12/1991 | Tendler et al. | |
| 5,086,506 A | 2/1992 | Hall et al. | |
| 5,093,923 A | 3/1992 | Leslie | |
| 5,129,096 A | 7/1992 | Burns | |
| 5,131,007 A | 7/1992 | Brown et al. | |
| 5,133,081 A | 7/1992 | Mayo | |
| 5,152,002 A | 9/1992 | Leslie et al. | |

(Continued)

FOREIGN PATENT DOCUMENTS

| | | |
|---|---|---|
| WO | 2008068479 A2 | 6/2008 |
| WO | 2011142893 A1 | 11/2011 |

OTHER PUBLICATIONS

Ten-page International Search Report mailed Jun. 8, 2011 for related counterpart case PCT/US2011/030277.

*Primary Examiner* — Tilahun B Gesesse
(74) *Attorney, Agent, or Firm* — Wood, Herron & Evans, LLP

(57) ABSTRACT

A signal repeating system for a wireless network includes an antenna configured for transceiving signals between a base station and a user equipment device. Repeating circuitry is coupled to the antenna and defines an uplink path for signals from the user equipment device to the base station and a downlink path for signals from the base station to the user equipment device. The repeating circuitry includes gain circuitry and gain control circuitry that is coupled to the gain circuitry. The gain control circuitry is operable for varying the gain of the repeating circuitry according to a waveform. Measurement circuitry measures the receive power in the uplink path over time from the user equipment device. Processing circuitry cross-correlates the inverted gain variation waveform with the measured receive power for determining the existence of traffic from user equipment devices in the uplink path.

20 Claims, 7 Drawing Sheets

(56) References Cited

U.S. PATENT DOCUMENTS

| | | | | |
|---|---|---|---|---|
| 5,163,158 | A | 11/1992 | Tendler et al. | |
| 5,371,734 | A | 12/1994 | Fischer | |
| 5,553,243 | A | 9/1996 | Harrison et al. | |
| 5,557,606 | A | 9/1996 | Moon et al. | |
| 5,613,204 | A | 3/1997 | Haberman et al. | |
| 5,625,870 | A | 4/1997 | Moon | |
| 5,627,876 | A | 5/1997 | Moon | |
| 5,678,176 | A | 10/1997 | Moon | |
| 5,711,004 | A | 1/1998 | Blasiak et al. | |
| 5,787,345 | A | 7/1998 | Moon | |
| 5,790,952 | A | 8/1998 | Seazholtz et al. | |
| 5,812,951 | A | 9/1998 | Ganesan et al. | |
| 5,901,341 | A | 5/1999 | Moon et al. | |
| 6,047,160 | A | 4/2000 | Priest et al. | |
| 6,198,920 | B1 | 3/2001 | Doviak et al. | |
| 6,339,694 | B1 | 1/2002 | Komara et al. | |
| 6,370,185 | B1 | 4/2002 | Schmutz et al. | |
| 6,374,115 | B1 | 4/2002 | Barnes et al. | |
| 6,404,775 | B1 * | 6/2002 | Leslie et al. | 370/466 |
| 6,418,324 | B1 | 7/2002 | Doviak et al. | |
| 6,441,723 | B1 | 8/2002 | Mansfield, Jr. et al. | |
| 6,529,486 | B1 | 3/2003 | Barnes et al. | |
| 6,614,781 | B1 | 9/2003 | Elliott et al. | |
| 6,650,649 | B1 | 11/2003 | Muhammad et al. | |
| 6,687,509 | B2 | 2/2004 | Schmutz et al. | |
| 6,690,915 | B1 * | 2/2004 | Ito et al. | 455/7 |
| 6,697,345 | B1 | 2/2004 | Corrigan, III et al. | |
| 6,748,212 | B2 | 6/2004 | Schmutz et al. | |
| 6,768,727 | B1 | 7/2004 | Sourour et al. | |
| 6,803,728 | B2 | 10/2004 | Balasubramaniam et al. | |
| 6,822,555 | B2 | 11/2004 | Mansfield, Jr. et al. | |
| 6,826,405 | B2 | 11/2004 | Doviak et al. | |
| 6,836,515 | B1 | 12/2004 | Kay et al. | |
| 6,850,499 | B2 | 2/2005 | Wheatley, III et al. | |
| 6,859,652 | B2 | 2/2005 | Karabinis et al. | |
| 6,889,033 | B2 | 5/2005 | Bongfeldt | |
| 6,983,162 | B2 | 1/2006 | Garani et al. | |
| 7,006,461 | B2 | 2/2006 | Kilfoyle et al. | |
| 7,016,332 | B2 | 3/2006 | Kilfoyle | |
| 7,020,436 | B2 | 3/2006 | Schmutz | |
| 7,034,663 | B2 | 4/2006 | Mansfield et al. | |
| 7,043,199 | B2 | 5/2006 | Dai et al. | |
| 7,062,224 | B2 | 6/2006 | Baker et al. | |
| 7,113,498 | B2 * | 9/2006 | Bajic | 370/338 |
| 7,119,676 | B1 | 10/2006 | Silverstrim et al. | |
| 7,230,935 | B2 | 6/2007 | Proctor, Jr. et al. | |
| 7,233,577 | B2 | 6/2007 | Choi et al. | |
| 7,233,771 | B2 * | 6/2007 | Proctor et al. | 455/11.1 |
| 7,236,470 | B1 * | 6/2007 | Bims | 370/328 |
| 7,295,119 | B2 | 11/2007 | Rappaport et al. | |
| 7,298,727 | B2 | 11/2007 | Kim et al. | |
| 7,299,402 | B2 | 11/2007 | Soong et al. | |
| 7,339,466 | B2 | 3/2008 | Mansfield et al. | |
| 7,349,360 | B2 | 3/2008 | Gutierrez et al. | |
| 7,355,993 | B2 * | 4/2008 | Adkins et al. | 370/318 |
| 7,395,056 | B2 | 7/2008 | Petermann | |
| 7,447,174 | B2 | 11/2008 | Joshi | |
| 7,471,620 | B2 | 12/2008 | Alazraki et al. | |
| 7,486,934 | B2 * | 2/2009 | Tanoue | 455/67.16 |
| 7,522,556 | B2 | 4/2009 | Hanna et al. | |
| 7,522,918 | B2 | 4/2009 | Wachter et al. | |
| 7,526,247 | B2 * | 4/2009 | Baker et al. | 455/11.1 |
| 7,551,921 | B2 | 6/2009 | Petermann | |
| 7,564,840 | B2 | 7/2009 | Elliott et al. | |
| 7,577,400 | B2 | 8/2009 | Karabinis et al. | |
| 7,602,782 | B2 | 10/2009 | Doviak et al. | |
| 7,613,232 | B2 * | 11/2009 | Meir et al. | 375/211 |
| 7,773,967 | B2 | 8/2010 | Smith | |
| 7,911,985 | B2 * | 3/2011 | Proctor, Jr. et al. | 370/279 |
| 7,929,906 | B2 * | 4/2011 | Lee et al. | 455/7 |
| 8,032,172 | B2 | 10/2011 | Adkins et al. | |
| 8,045,917 | B2 | 10/2011 | Beck et al. | |
| 8,060,009 | B2 | 11/2011 | Gainey et al. | |
| 8,073,387 | B2 | 12/2011 | Maslennikov et al. | |
| 8,111,645 | B2 | 2/2012 | Proctor, Jr. et al. | |
| 8,116,254 | B2 | 2/2012 | Sabat et al. | |
| 8,223,821 | B2 | 7/2012 | Hannan et al. | |
| 8,346,091 | B2 | 1/2013 | Kummetz et al. | |
| 8,346,160 | B2 | 1/2013 | Kummetz | |
| 2006/0063485 | A1 * | 3/2006 | Gainey et al. | 455/15 |
| 2007/0268846 | A1 | 11/2007 | Proctor et al. | |
| 2008/0182511 | A1 * | 7/2008 | Adkins et al. | 455/9 |
| 2008/0293360 | A1 * | 11/2008 | Maslennikov et al. | 455/24 |
| 2009/0196215 | A1 * | 8/2009 | Sabat et al. | 370/315 |

\* cited by examiner

SYSTEM AND METHOD FOR DETECTING AND MEASURING UPLINK TRAFFIC IN SIGNAL REPEATING SYSTEMS

RELATED APPLICATIONS

This Application is a continuation Application of U.S. patent application Ser. No. 12/778,312 on May 12, 2010, entitled "SYSTEM AND METHOD FOR DETECTING AND MEASURING UPLINK TRAFFIC IN SIGNAL REPEATING SYSTEMS", which application is incorporated herein by reference in its entirety.

FIELD OF THE INVENTION

The present invention is directed generally to signal repeating systems, such as repeaters or distributed antenna systems, for wireless communications, and more particularly to a system and method for detecting uplink traffic from mobile user equipment within those systems.

BACKGROUND OF THE INVENTION

In existing wireless technologies, signal repeating devices, such as repeaters or distributed antenna systems (DAS), are used to extend the coverage of an overall wireless system beyond the range of traditional base stations. For example, an overall wireless communication system may consist of a plurality of base transceiver stations (BTS) or base stations that communicate with each other and with user equipment, such as cellular phones, to provide a defined coverage area. In such coverage areas, there are often smaller geographical areas that have very low signal coverage, as provided by one or more of the base stations. For example, such areas of low signal coverage may be within buildings or in areas that are otherwise obstructed, such as by terrain features or man-made structures. Rather than simply implementing another costly and large base station to provide coverage in such low signal areas, repeaters and distributed antenna systems are often utilized.

While repeaters and distributed antenna systems (herein collectively, "signal repeating systems") may adequately extend coverage, it may be desirable to eventually install a dedicated BTS in order to increase the amount of capacity offered in the area. To that end, it is desirable to be able to determine the relative loading and traffic of a signal repeating system so that a building owner or other system operator is aware of the traffic requirements for that wireless environment.

One method of detecting traffic within a mobile network is to utilize the receive signal strength indication (RSSI) measurement of the power that is present in a received radio signal. The RSSI is a well-known parameter in the operation of signal repeating systems. The RSSI-based detection method for determining traffic within a wireless environment or network is used extensively in GSM repeaters and distributed antenna systems. Usually, the uplink RSSI is utilized to determine the uplink traffic from mobiles that are within the coverage range of a signal repeating system. The signal repeating system identifies the channels used by the adjacent base stations and it then distributes and amplifies the signals in order to monitor the equivalent uplink (UL) frequencies. If the RSSI level on a UL channel exceeds a certain threshold, the system can detect the UL traffic. The threshold level is usually a level above the receiver input noise floor for the signal repeating system. The specific delta with respect to the noise floor depends upon the acceptable probability of having false positive detections, which might be triggered by regular thermal noise peaks. In addition to the independent measurement of the RSSI levels, the signal repeating system can determine the RSSI within a certain timeslot by synchronizing itself with the base station through the detection of the downlink (DL) signal. Therefore, for such a gated RSSI measurement, the repeater or distributed antenna system can measure UL activity on a timeslot-per-timeslot basis.

However, while such a methodology works adequately for GSM repeaters and distributed antenna systems, the implementation of such a traffic detection and measurement system in a spread spectrum environment, such as CDMA or WCDMA, is more difficult. Generally, in a CDMA or CDMA network, the mobile devices or other user equipment (UE) devices are driven so that the transmit power is controlled in order to be close to or below the noise level of the receiving base station. In a typical configuration, the repeater or distributed antenna system operating in such a network essentially acts to extend the UL receiver of the base station. In that regard the repeater/DAS experiences the same low level receive signal from the user equipment devices. That is, the receive signal level from those devices is at the noise level, or even below the noise level, for the repeater/DAS. As such, this makes the use of RSSI-based uplink traffic detection and measurement generally unfeasible for such networks.

There are other mechanisms for determining the uplink traffic within a CDMA system, but those mechanisms require the specific spreading codes that are used for the various uplink signals received from the mobile UE devices. However, those spreading codes are known to the base station system, and are not necessarily known by the repeater or DAS. Therefore, a system that incorporates uplink traffic detection that relies upon correlation with dynamically-assigned uplink spreading codes generally will not be a feasible alternative for detecting and measuring uplink traffic within a repeater or DAS.

Accordingly, there is a need for providing a traffic measurement system for a repeater/DAS that can adequately detect and measure the uplink traffic within a spread spectrum network, such as a CDMA or WCDMA network or another network where the UL signal is at or close to the noise level of the system.

The accompanying drawings, which are incorporated in and constitute a part of this specification, illustrate embodiments of the invention and, together with a general description of the invention given below, serve to explain the principles of the invention.

DETAILED DESCRIPTION OF THE EMBODIMENTS OF THE INVENTION

The present invention incorporates a system and method that utilizes an RSSI-based mechanism to determine the presence of uplink (UL) traffic within a CDMA network or other network to measure the strength of the detected UL traffic. In one aspect of the invention, the gain of a signal repeating system, such as a repeater or DAS, is periodically varied in the uplink direction. The uplink received power, or RSSI, for the expected uplink channel of the repeating system is measured over time. For the purposes of measuring the RSSI, a suitable measurement receiver is utilized. The measurement receiver is tuned to match the center frequency and signal bandwidth that is to be measured for the purposes of the invention. The measurement receiver may be configured for receiving either an analog signal or a digital signal within the signal processing uplink path, and will generally be coupled in the signal path at a point that precedes the stage providing the gain variation. The waveform that is utilized to provide the periodic gain variation in the uplink path is then inverted due to the inverse relationship between the gain and RSSI values and the inverted waveform is then cross-correlated with the received UL time-variant RSSI values. When one or more peaks are detected associated with such cross-correlation, the level of the peak, or the number of peaks, are analyzed to determine the amount of traffic in the system. If no peak is detected, then the system determines that there is no UL traffic in the repeater. Generally, the correlation process might only provide a single peak wherein the peak is higher or wider, depending on the amount of traffic handled by the repeater.

In accordance with another aspect of the invention, the inventive system takes into account that the base station (BTS) may experience an increased amount of traffic, which will increase the UL input power to the BTS for the same amount of UL traffic in the repeater/DAS cell, which will inherently increase the transmit power received (RSSI) at the input to the uplink path of the repeater/DAS. But since the correlation between the gain variation waveform and the measured RSSI is sensitive to the dynamic RSSI change caused by the mobiles in the repeater cell and less to the relative to the gain change assumed static BTS loading the invention will allow the detection of mobile traffic under different BTS loading conditions in a similar fashion.

Figure 1:
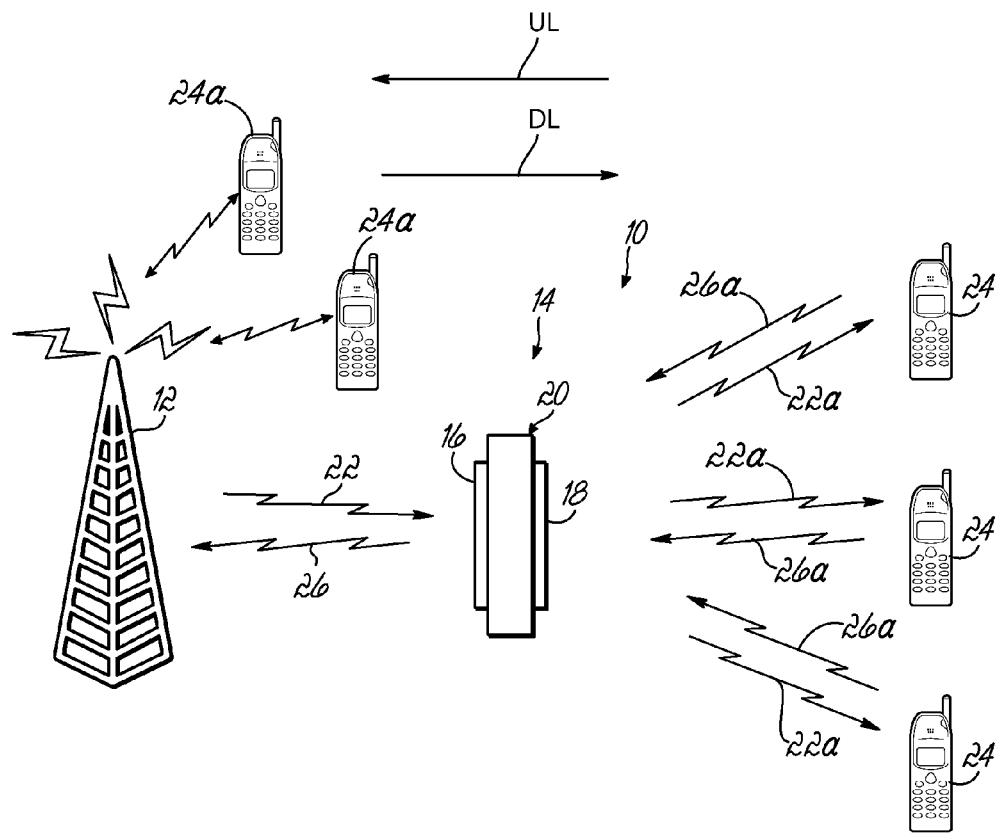
FIG. 1 is a schematic view of a repeater system for implementing an embodiment of the present invention.
Figure 2:
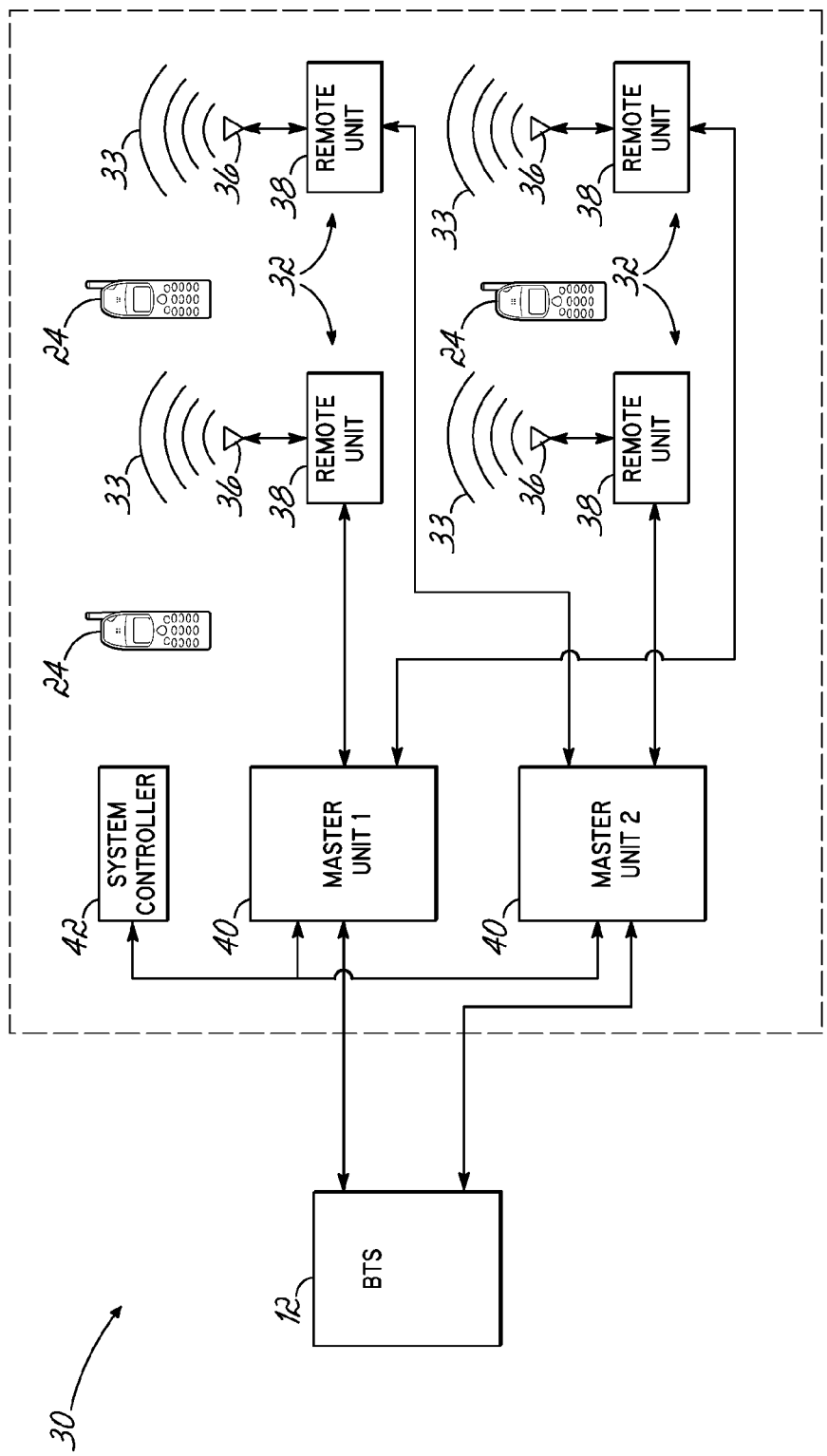
FIG. 2 is a schematic diagram of a distributed antenna system for implementing an embodiment of the present invention.

FIGS. 1 and 2 illustrate exemplary signal repeating systems that may incorporate embodiments of the present invention. Referring to FIG. 1, a basic wireless communication system 10, incorporating a signal repeating system 14, is shown. System 10 includes a base station (BTS) 12 that communicates with a repeater system 14 that has at least one donor antenna 16, at least one coverage antenna 18, and processing electronics 20 that are coupled between the antennas 16 and 18 to process and amplify the repeated signal. The present invention may be used with MIMO systems and communication schemes, and thus, may have multiple donor antennas and multiple coverage antennas, as would be understood by a person of ordinary skill in the art. Therefore, antennas 52, 58 are reflective of one or more antennas. The downlink signals (BTS to mobile device/UE) are indicated by direction DL, while the uplink signals (mobile device/UE to BTS) are indicated by direction UL. Accordingly, downlink wireless signals 22 are received from the BTS 12 by the donor antenna 16 of the repeater, and are then amplified, processed, and repeated through the coverage antenna 18 as downlink signals 22a. The downlink signals 22a are received by one or more wireless communication devices, such as mobile phones or other user equipment (UE) device 24. Similarly, in an uplink direction, as indicated by reference numerals 26 and 26a, the wireless UE devices 24 communicate uplink signals 26a back to the coverage antenna and the repeated uplink signals 26 are then provided back to the BTS 12. Also in the system 10 are UE devices 24a that communicate with BTS 12 directly rather than through a repeater 14. Such devices 24a contributed to the overall traffic handled by the BTS 12. As will be readily understood by a person of ordinary skill in the art, such signal repeating systems 14 can take many different forms and are not limited only to devices conventionally called "repeaters".

For example, FIG. 2 illustrates a schematic diagram for another exemplary signal repeating system that may implement the invention. A distributed antenna system (DAS) 30 may be appropriately coupled to a BTS, such as BTS 12 in a wired or wireless fashion. The distributed antenna system 30 might be incorporated into a building environment and includes a number of remote antenna units 32 that are distributed in the environment to provide coverage within a service area of the DAS 30. In that way, the remote antenna units 32 service a number of different UE devices 24 operating in the environment of the DAS 30. Generally, each remote antenna unit 32 typically includes at least one antenna 36 and suitable electronics 38. As noted above, if the invention is implemented in a MIMO system, multiple antennas 36 might be used. Therefore, antennas 36 are reflective of one or more antennas. Remote antenna units 32 are coupled to one or more master units 40, which combine and process the signals from the remote antenna units 32 to interface appropriately with the BTS 12. A system controller 42 couples to and controls the operation of each of the master units 40 for handling and processing the signals 33 associated with the remote antenna units 32. Similar to the repeater system 10 illustrated in FIG. 1, the signals 33 of the remote antenna units 32 are reflective of the uplink and downlink signals of the DAS 30 for communicating with UE devices 24. Such a DAS 30 may incorporate any number of remote antenna units and master units, and thus, would not be limited to the illustrated example shown in FIG. 2.

In accordance with one aspect of the invention, periodic gain variation is provided in the repeater or DAS uplink path. For example, the gain in the UL path might be varied according to a periodic waveform. Ideally, the periodic gain variation and waveform is synchronized with the framing interval of the spread spectrum network, such as a CDMA network, although such synchronization is not necessary. With the periodic gain variation, the UL receive power (UL RSSI value) in the selected UL channel is measured over time by the signal repeating system. The waveform that is utilized to periodically vary the gain in the uplink path is then cross-correlated with the UL received time-variant RSSI values. Based upon such cross-correlation of those signals, the existence of one or more peaks is determined. If there is no peak detected, then the signal repeating system would provide an indication that there is generally no repeater traffic as the periodic gain variation would not cause any variation in the uplink RSSI values. However, if the periodic gain variation causes variations in the uplink RSSI values, then the cross-correlation performed by the signal repeating system would yield one or more signal peaks. Such peaks are an indication that if there is uplink traffic from UE devices within the coverage area of the signal repeating system. The level of the peak and its width as well as the energy in the peak if integrated over the time delay of the cross-correlation may be indicative of the amount of traffic within the coverage area of the signal repeating system. However, the overall traffic in the BTS can affect the peak levels, as discussed below.

In one embodiment of the invention, the measured uplink RSSI values might be averaged according to an averaging scheme over time that reduces fast RSSI value fluctuations without affecting or reducing the correlation peak. The present invention works not only with CDMA-type signals, but also other system signals and network signals that allow for the received power at the BTS to be close to the noise floor and even below the input noise floor of the BTS. For example, OFDM modulated systems such as LTE systems might benefit from the present invention.

In accordance with one aspect of the present invention, the periodic gain variation in the signal repeating system is performed without significantly affecting the noise figure of the signal repeating system. To that end, the gain of the system is varied by changing the gain in an amplification stage of the repeater or DAS that is not very close to the input of the uplink path. That is, a latter gain stage in the uplink path is used for the periodic gain variation. To provide for suitable cross-correlation in accordance with the present invention, a selected periodic waveform is used to periodically vary the gain of the UL path of the signal repeating system. Such a waveform may be adapted to the specific mobile standard that is used within the signal repeating system. To that end, the periodic gain variation is controlled so that the size of the gain variation and its time period is not faster than the mobile standard allows or can handle. For example, CDMA mobile devices can handle 800 power control steps of one dB per second. As such, in accordance with one feature of the invention, the implemented periodic UL gain variation does not exceed that rate of change when the invention is utilized within a CDMA system. As will be appreciated, other systems will have other gain variation constraints that would be implemented in the invention.

In one embodiment of the invention, the gain variation is provided by reducing the gain in a periodic fashion in the signal repeating system. For the purposes of the invention, various different waveforms might be utilized to periodically reduce the system gain in the UL path. For example, an inverted Sawtooth function with gaps may be used as a possible periodic gain variation function. The present invention provides maximization of the cross-correlation peak between the inverted gain variation function and measured UL input RSSI. To that end, in one aspect of the invention, the gain variation function may be aligned in phase and frequency with the mobile standard (e.g. CDMA). In accordance with another feature of the invention, the sensitivity of the traffic detection may be increased by averaging multiple consecutive (i.e. several consecutive frames) cross-correlation curves. The periodic nature of the gain variation allows such averaging of the cross-correlation curves. To that end, the length of the data that is measured is ideally an integer multiple of a frame length of the particular mobile standard, such as the CDMA standard.

The bandwidth and center frequency settings of the RSSI measurement receiver will depend on the used channel and expected standard. The used channel and standard can be determined through the detection and decoding of the equivalent DL signal using a decoding receiver. This DL signal decoding does not necessarily have to be performed with a dedicated receiver as the standard is not expected to change. A scanning DL decoding receiver would be sufficient.

In cases in which the repeater/DAS system processes a variety of standards a sub-band architecture will allow a different gain variation in time or in amplitude within two or more different sub-bands. A sub-band is a section within the RF band that represents a subset of the entire bandwidth. There can be multiple sub-bands with the RF band. Sub-bands might be adjacent to each other or have a section between them with no amplification. In the implementation of the sub-bands a surface acoustic wave filter (SAW) might be used to define the sub-band. In a digital implementation of the invention, a digital filter such as a FIR filter or IIR filter could be used instead to define the sub-band. This will allow optimizing the cross-correlation function for each standard. For each sub-band, only one mobile communication standard is allowed for optimization.

Figure 3:
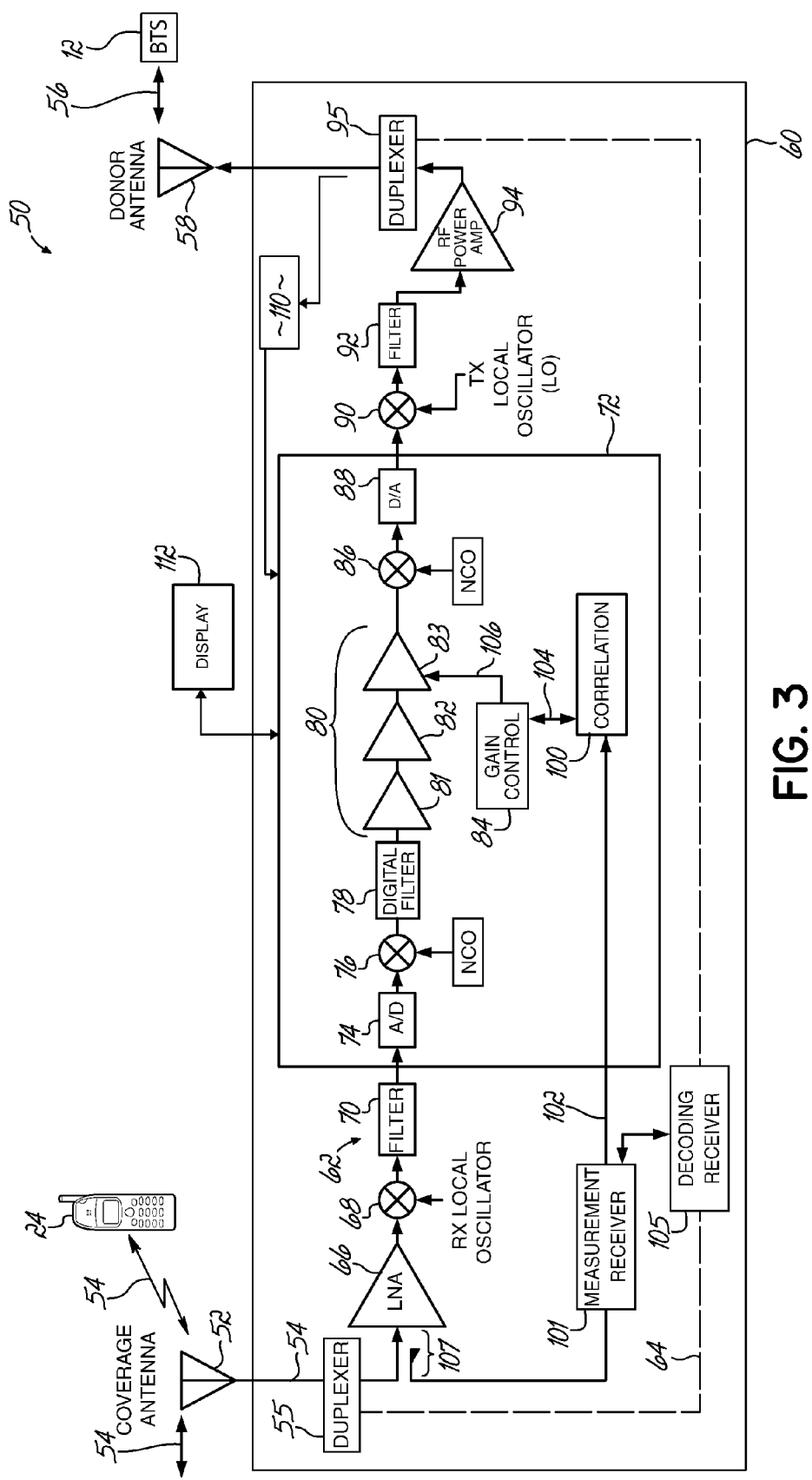
FIG. 3 is a more detailed schematic illustration of a repeater system for implementing an embodiment of the present invention.
Figure 3A:
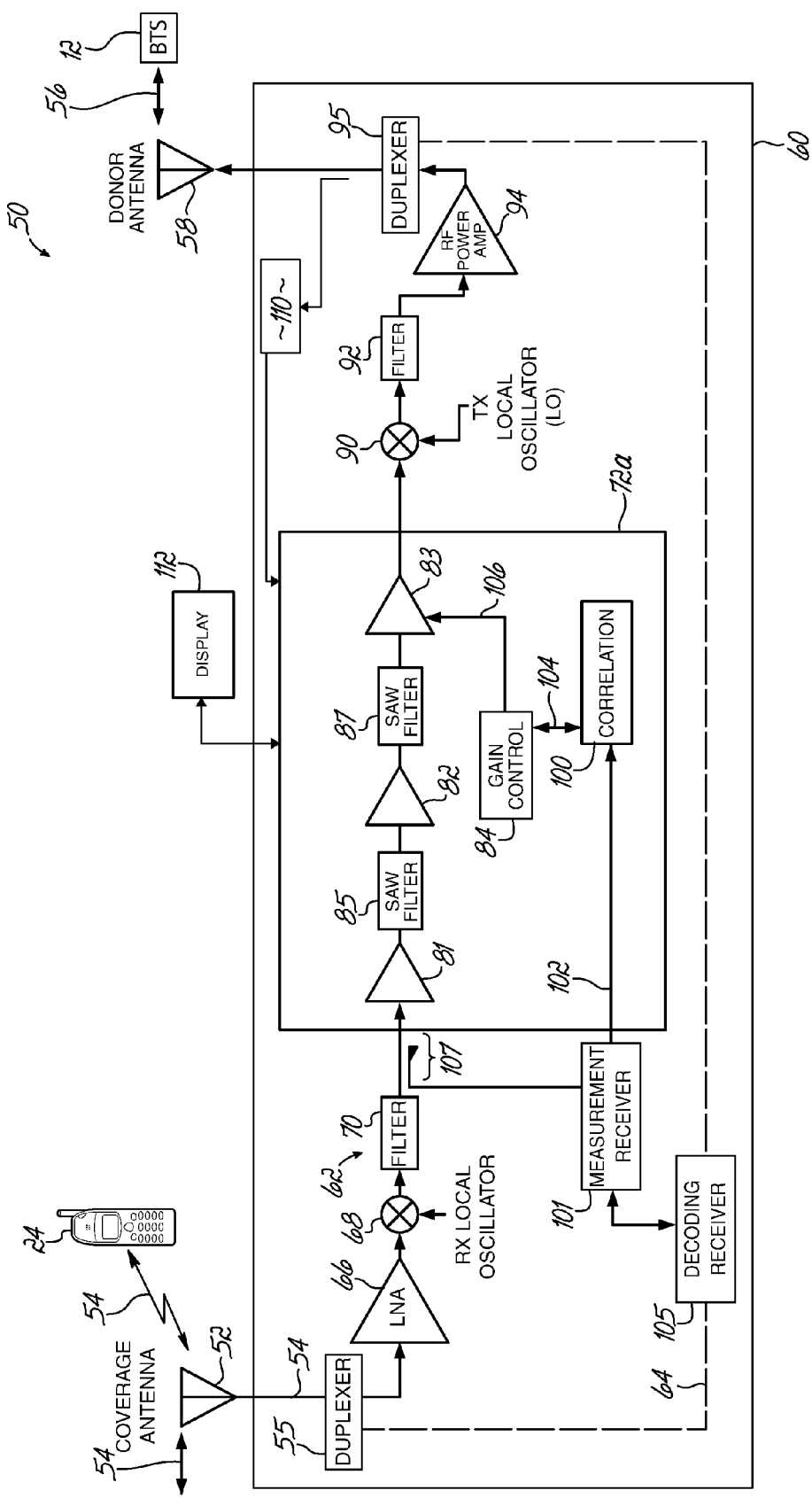
FIG. 3A is a schematic of another repeater system for implementing an embodiment of the present invention.
Figure 4:
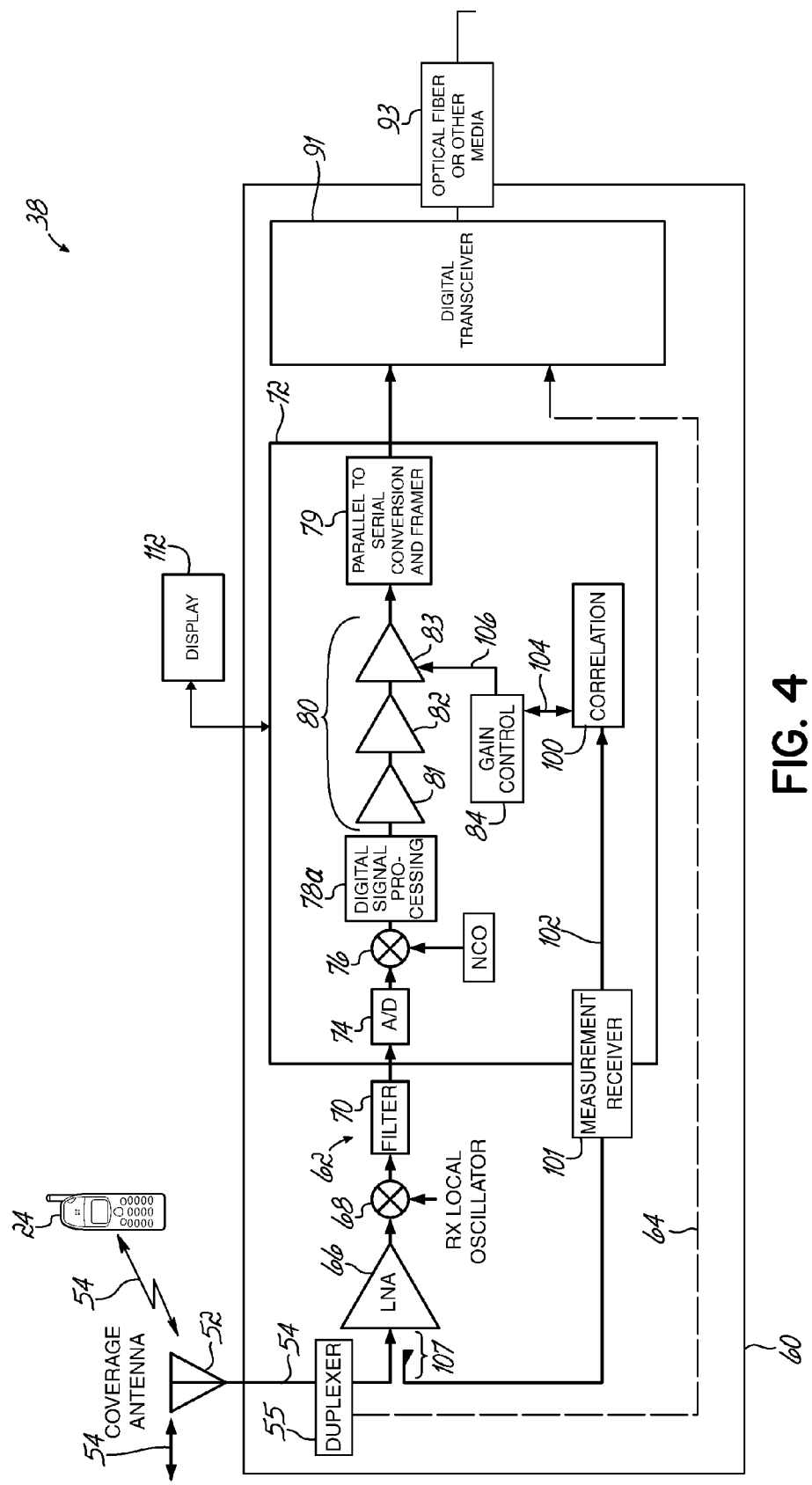
FIG. 4 is a more detailed schematic illustration of a distributed antenna system implementing an embodiment of the present invention.
Figure 4A:
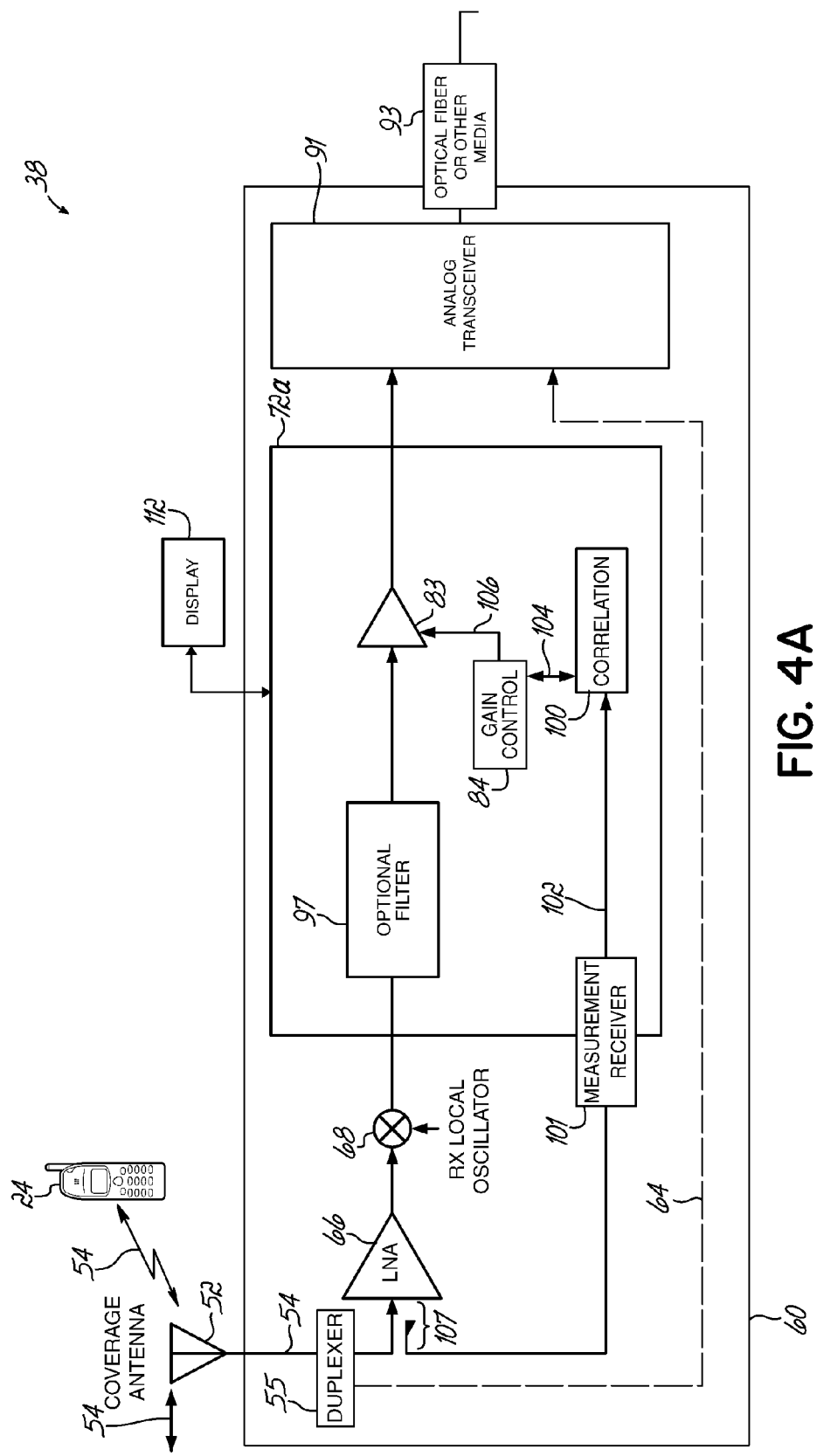
FIG. 4A is a schematic of another distributed antenna system for implementing an embodiment of the present invention.

FIGS. 3, 3A, 4, and 4A illustrate detailed schematics of possible implementations of the invention. FIGS. 3 and 3A illustrate repeater systems. FIGS. 4 and 4A illustrate implementation within a DAS system, as illustrated in FIG. 1. Like reference numerals are used for like elements in the various Figures.

Referring to FIG. 3, a schematic block diagram of a repeater 50 is illustrated. FIG. 3 shows the uplink path (UL) 62 for the repeater for illustration purposes. It will be readily understood that the repeater 50 also incorporates a suitable downlink (DL) path 64 that would use some similar components as the downlink paths between the BTS 12 and devices 24. Diplexers 55, 95 are utilized to handle the UL and DL paths through the antennas 52, 58. A repeater 50 incorporates a receive antenna 52 (or coverage antenna) for processing input signals 54 from one or more mobile UE devices 24. The input signals 54 represent the input signals from the UE devices 24 that are to be repeated. Thus, signals 54 represent the UE traffic to be detected in accordance with the invention. The repeated transmit signals 56 illustrated in FIG. 3 include the transmitted signals or signal portions that are directed in the uplink to BTS 12 by a coverage antenna 58. Throughout the application, the terms "signal" or "signals" are used interchangeably herein to refer to the signal(s) handled by the signal repeating system and are not limited to just a single signal or plurality of signals.

For proper signal repeating, repeater 50 includes suitable electronics 60 that are operably coupled between the antennas 52, 58. Generally, such electronics will include gain control circuitry 84 that provides a desired or selected gain G in the repeater and processing 72 and correlation 100 circuitry to implement the invention.

Referring to FIG. 1, the repeater circuitry 20 might process the signals in the analog domain in accordance with aspects of the invention. Alternatively, electronics 20 of the repeater might provide the various aspects of the invention in the digital domain.

Turning again to FIG. 3, as noted, that figure sets forth a schematic diagram with respect to one embodiment of the invention in the form of a repeater device. It will be understood by one of ordinary skill in the art that the features of the invention might be incorporated in other signal repeating systems, such as a distributed antenna system, as illustrated in FIGS. 2, 4, and 4A. As noted, components are shown in an uplink path 62 in the repeater 50. Various similar components will exist in the downlink path 64 for handling downlink traffic between wireless UE devices 24 and a BTS 12 for example. Accordingly, various components within the uplink path 62 will be described herein in further detail with the assumption that some similar functionality and components would be utilized in the downlink path 64 as well, although the periodic gain variation of the invention might only be used in the uplink path.

Receive or coverage antenna 52 receives the input traffic signals 54 from UE devices 24. Those signals 54 are coupled through diplexer 55 to a low noise amplifier (LNA) 66 for amplifying uplink the RF receive signals from device 24. A mixer component 68 is fed by an appropriate local oscillator (LO) signal and converts the RF receive signal 54 to an intermediate frequency (IF) signal at a different IF frequency or a frequency at or near the baseband frequency for ease of later processing in the repeater 50. The signal may then be filtered by an appropriate filter component or circuitry 70. In the embodiment illustrated in FIG. 3, the repeater circuitry incorporates both analog and digital components. Digital signal processing circuitry 72 is implemented for providing the filtering and further frequency conversion of the signals, as well as for periodically adjusting gain and for providing the necessary cross-correlation and signal processing to detect UL traffic in accordance with the invention. Appropriately, an ND converter circuit 74 converts the analog signal to an appropriate digital signal for further digital processing. The DSP circuitry 72 might be an FPGA, ASIC, digital signal processor or other such element. The DSP circuitry might include an additional digital mixer circuit 76 fed by a suitable numerically-controlled oscillator (NCO) signal to provide digital downconversion for ease of further processing. The signal might also be filtered by an appropriate digital filter 78. Filter 78 might also change the amplitude of the signal. Gain circuitry 80 or amplification circuitry provides gain amplification to the repeated signals. Components 80 and 84 represent suitable circuitry for periodically adjusting or varying the gain within repeater 50 for the invention. The signals might then be digitally upconverted by appropriate digital upconversion circuitry 86 fed by a transmit NCO. The signals may then be converted back to analog signals by D/A circuitry 88.

Various of the gain and filtering aspects illustrated in the digital circuitry 72 of FIG. 3 might also be implemented in an analog fashion. FIG. 3A shows an analog repeater for implementing the present invention. Like reference numerals are utilized for those components similar between FIGS. 3 and 3A. Therein, gain stages 81, 82, and 83 might be implemented in an analog fashion with analog filters, such as SAW filters 85 and 87 providing the desired filtering. In the embodiment illustrated in FIG. 3A, the correlation circuitry 100 might still be implemented by appropriate digital signal processing (DSP) circuitry. Also, certain portions of the gain control circuitry 84 might be implemented digitally.

The analog signals, such as at analog IF, are further upconverted with mixer circuitry 90 fed by an appropriate transmit LO to an appropriate RF signal. The RF signal is filtered by filter circuitry 92, and then fed to an RF power amplifier 94 before being transmitted as a repeated signal 56 through the transmit or donor antenna 58. The various mixing and filter elements are typical of a repeater. There can be more or fewer mixing elements than illustrated in the examples and still implement a functional repeater.

In the embodiments illustrated in FIGS. 3, 3A, the noted cross-correlation functionality is provided by suitable processing circuitry and correlation circuitry 100, such as within the digital signal processing (DSP) circuitry 72, or otherwise implement digitally, as in FIG. 3A. The cross-correlations to determine UL traffic are performed by capturing samples 102 of the signals in the UL path at the UL input and providing RSSI values reflective of the receive power of the signals at the UL input for the cross-correlation.

Accordingly, as illustrated in FIGS. 3-4A, a suitable measurement receiver 101 is utilized to capture signals in the uplink path and to provide RSSI values reflective of the received power of such signals. The bandwidth and center frequency of the RSSI measurement receiver 101 are turned and configured to detect the RF signal of interest. Therefore, the bandwidth and center frequency would depend on the used channel and the expected standard for the signal. The used channel and standard may be determined through the detection decoding of the equivalent downlink signal such as by using a decoding receiver. The downlink signal decoding would not necessarily have to be performed with a dedicated receiver, as the signal standard would not be expected to change. A scanning downlink decoding receiver would be sufficient. One example of such decoding receiver 105 is illustrated in the downlink path 64 of the figures. As illustrated in FIG. 3, the capture point for the signal is illustrated close to the coverage antenna wherein an appropriate coupler 107 captures the signal that is then directed to the measurement receiver 101. For the purposes of the invention, the capture point for such data can be anywhere between the coverage antenna and the amplification stage that performs the periodic gain changes. Accordingly, as illustrated in FIG. 3A, the capture point is indicated following filter 70. Accordingly, the capture point can be directed at various different points along the uplink path, with the condition that it is before the components or stages that perform the periodic gain changes. The measurement receiver 101 can either be implemented as analog circuitry with an A/D converter to provide the digitized measured RSSI to the correlation circuitry or as digital circuitry on a repeater system with digital signal processing where the input to the measurement receiver is captured at a point after the A/D converter 74.

In the illustrated embodiments, the correlation circuitry 100 coupled to the measurement receiver 101 samples the RSSI values for repeated signal 102 via suitable connections and is also coupled to obtain information regarding the waveform 104 used in the repeater path to periodically vary the UL gain. It will be understood by a person of ordinary skill in the art that the various different functionalities discussed within the correlation circuitry 100 digital signal processing circuitry 72 might be implemented in a number of different ways to achieve the functionality of the invention. Accordingly, the illustrations of FIGS. 3-4A are not limiting with respect to the DSP circuitry. That is, the specific details regarding how the various components are utilized and arranged within DSP circuitry 72, or the analog and digital circuitry 72a, and the overall repeater or DAS circuitry of FIGS. 3-4A are illustrative, and not meant to be limiting.

FIGS. 4 and 4A illustrate implementation of the invention within a distributed antenna system, particularly within a remote antenna unit component 38. In the embodiment of FIG. 4, digital circuitry is utilized for implementing the gain and gain control within the system. Furthermore, for putting signals in the necessary form for serial transmission, such as back to a master unit, the digital signal circuitry 72 of FIG. 4 utilizes the necessary signal processing element 78A and conversion circuitry 79 for providing the necessary parallel-to-serial conversion and framing. As would be understood by a person of ordinary skill in the art, digital transceiver circuit 91 will further process the signals for transmission over suitable media, such as optical fiber or other media 93.

FIG. 4 illustrates another embodiment of the invention implemented within a remote unit of the distributed antenna system, wherein the processing circuitry 72a incorporates analog and digital components. For example, an analog filter 97 might be utilized with a suitable analog gain stage 83.

Mixing stage 68 is another optional component that can be used to down-convert the RF signal.

In accordance with one aspect of the invention, it is desirable to provide the periodic uplink gain variation without affecting the overall noise figure of the signal repeating system. This might be achieved in one embodiment by varying the gain in a gain stage that is not very close to the UL input. Referring to FIGS. 3, 3A, the gain component 80 of the repeater 50 might incorporate various amplification or gain stages, illustrated by gain stages 81, 82, and 83. The last gain stage 83 that is farthest from the UL input from the coverage antenna 52 might be coupled with appropriate gain control circuitry 84 in order to periodically vary the gain in accordance with the invention. To that end, gain stage 83 is appropriately coupled via connection 106 with the gain control circuitry 84.

In an alternative embodiment of the invention wherein the repeater or DAS system processes a variety of standards, a sub-band architecture is utilized to allow the different gain variation in time or in amplitude within two or more different sub-bands. For example, as illustrated in the figures, the circuitry which captures uplink signals, processes those signals in accordance with the invention, and then provides periodic gain variation might be configured to do so for one or more different sub-bands. A sub-band is a section within the RF band of interest that represents a sub-set of the entire bandwidth. It can be multiple sub-bands with the RF band, as noted above. In the circuitry, the suitable filtering circuitry might be configured and utilized to define the particular sub-bands for an analog implementation. As illustrated in the figures for analog processing, a surface acoustic wave filter (SAW) might be used to define the sub-band. Digitally, a digital filter such as an FIR filter or IIR filter could be used to define the sub-band. The cross-correlation function then provided by the appropriate correlation circuitry 100 of the invention may be optimized for each standard. For each sub-band, only one mobile communication standard is allowed for optimization.

As noted, in one embodiment of the invention, the periodic gain variation includes a periodic gain decrease in the signal repeating system. That is, the gain is lowered in the UL path 62 on a periodic basis and according to a suitable waveform. The invention is not limited to a particular periodic gain reduction waveform. Gain control circuitry 84 provides the necessary waveform and specific control of at least one of the gain stages, such as gain stage 83, in order to accomplish the periodic reduction in the gain in the repeater UL path.

It will be appreciated that reducing the gain of a repeating system may affect mobile UE devices that are on the fringe of the repeating system cell. Therefore, the time that the repeater is maintained at low gain values is preferably kept short. In accordance with existing power control schemes associated with spread spectrum networks, such as CDMA networks, upon reducing the gain of a repeater, the receive signal (RSSI) at the BTS 12 from repeater 50 is also reduced. Accordingly, the BTS 12 will order the mobile UE devices 24 to increase their output power or transmit power thus providing increased uplink RSSI values at the repeater 50, as needed by the BTS 12. The increased power signals from the mobile UE devices are sampled in time and user by the correlation circuitry 100 via path 102 where the time-variant RSSI values are cross-correlated with the inverted gain control waveform 104. Based upon the existence of traffic in the uplink path of the repeater 50, increased power signals from UE devices will cross-correlate with the inverted periodic gain variations and the correlation circuitry 100 will yield one or more peaks. Higher peaks may indicate a greater amount of traffic being handled in the uplink path of the repeater. If there is no peak detected, it is generally concluded that there is no repeater traffic in the system at that time. As noted, the gain variation and cross-correlation is periodic and short-lived in order to not significantly deplete battery power from the mobile UE devices or to otherwise reduce the capacity of the BTS 12 or other base stations adjacent to BTS 12 which may now hear the mobile devices that are transmitting at higher transmit power levels.

In order to implement the maximization of the cross-correlation peaks between the periodic gain variation function and the measured UL input RSSI, the invention might utilize specific mechanisms, such as alignment of the gain variation function in phase and frequency with that of the mobile standard, such as the CDMA standard. Furthermore, the sensitivity of the traffic detection methodology disclosed herein could take advantage of the periodic nature of the gain variation and the DSP 72 may average multiple consecutive cross-correlation curves. That is, correlation curves may be averaged by the DSP 72 or circuitry 100 across several consecutive frames within the mobile standard. In one aspect of the invention, the data is measured in a period that is an integer multiple of the frames within the mobile standard.

In accordance with another aspect of the invention, the circuitry of the invention optimizes the correlation peak provided by correlation circuitry 100 by varying the overall gain plateau around which the periodic gain variations are performed. For example, the UL gain plateau or average gain is reduced overall so that when the mobile UE devices are transmitting at a higher output power (periodic reduced repeater gain), the received uplink RSSI at the repeater input will be higher and more distinct as compared to the overall noise floor or noise level of the repeater.

In reducing the UL average gain, it may be necessary to take into account mobiles that may be on the fringe of the repeater or DAS cell, or on the fringe of whatever coverage area the signal repeating system provides. For such fringe mobile UE devices, the increase in output power might not be possible, as they may already be transmitting at maximum power. Since the gain variation provided by the invention is periodic, there may still be sufficient time with the repeater at a higher gain such that the fringe UE devices may continue to maintain their connectivity with the BTS 12. However, it may be difficult to detect those fringe mobiles utilizing the present invention. However, in the general case, the signal repeating system may have a lower downlink output power similar to the BTS, which limits the repeating system cell radius at the downlink so that the uplink path might still have a sufficient RF power adjustment range in order to allow the fringe UE devices and the traffic therefrom to be measured in accordance with the invention.

The detection process of the present invention, and specifically the correlation peaks between the time-variant RSSI associated with the uplink traffic and the inverted gain variation function or waveform depend upon the amount of mobile UE devices (i.e., traffic) that are in the coverage area for a signal repeating system for a given average gain of that system. However, the correlation peak also depends on the amount of direct traffic that is seen overall by the BTS. As will be appreciated, a BTS will generally be handling uplink signals from those repeating systems in its coverage area, but also will be handling direct uplink signals from the UE devices area that do not pass through the repeater. In order to determine the proper amount of traffic and to not overestimate repeater traffic, the invention takes into account the direct traffic on the BTS with respect to the correlation peak measurements that are made in accordance with the invention.

When a large number of mobile UE devices 24 directly transmit to the BTS 12, the noise level or noise figure of the BTS increases. Based upon the increase of the noise level, the BTS 12 will instruct the UE devices 24 to transmit with a higher transmit power so that their signals are not lost in the noise. This higher transmit power level also results for those UE devices that are handled through the repeater or DAS. Accordingly, by detecting the UL traffic in that repeater or DAS, according to the invention, the higher UE transmit power values translate into higher RSSI values at the repeater and thus, will result in higher correlation peaks even if the average UL gain remains the same and the gain variation waveform remains the same.

Figure 5:
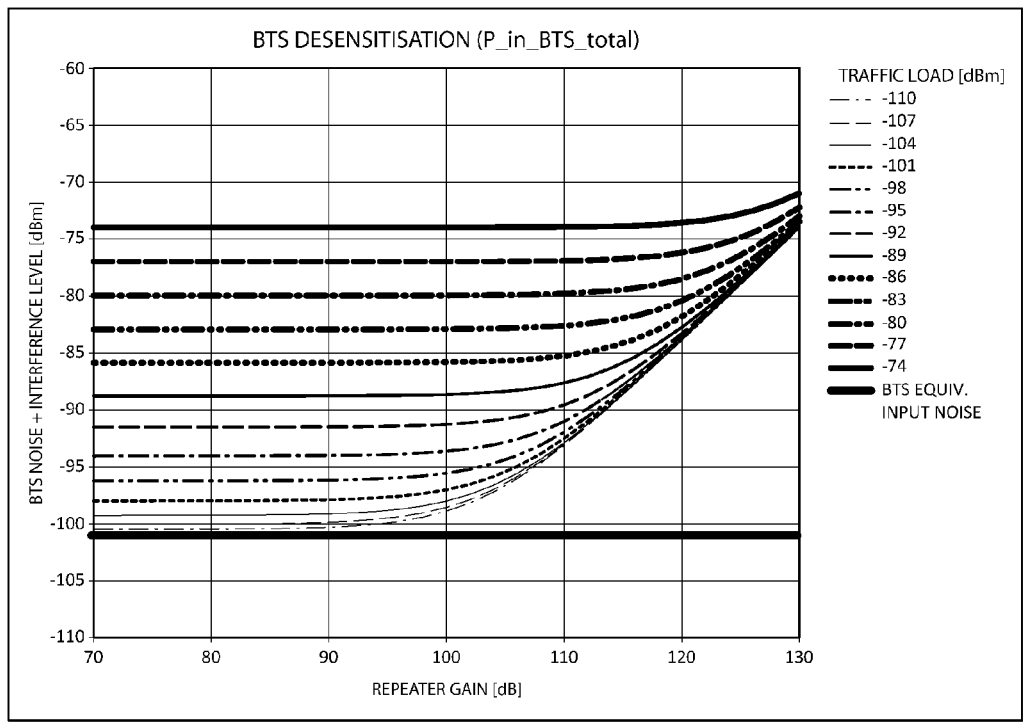
FIG. 5 is a graphical illustration of the effect of repeater gain variation on the received power of a base station with UL power control in operation.
Figure 6:
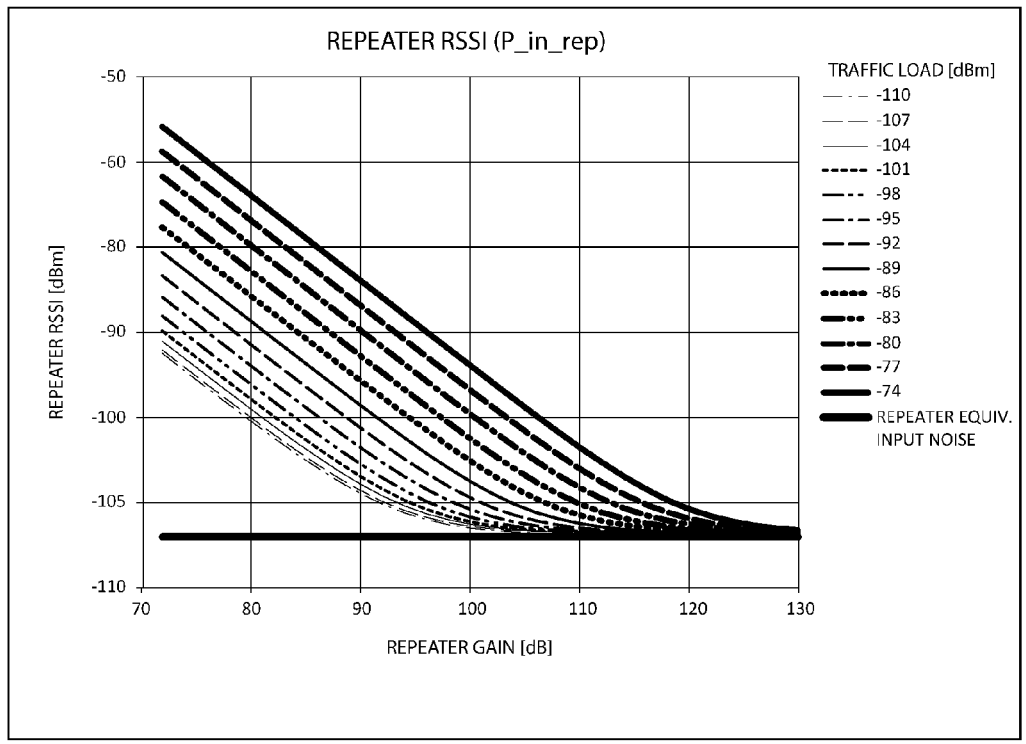
FIG. 6 is a graphical illustration of the effect of repeater gain variation on the power received at the repeater.

Referring to FIGS. 5 and 6, FIG. 5 illustrates the impact of the repeater gain in the uplink path on the BTS receiver RSSI, for different loading of the BTS. Where in FIG. 5 the BTS input power $P_{in}$ rises with increase repeater gain in the U.L., the BTS is desensitized due to the noise transmitted by the repeater or DAS and received at the BTS receiver input. As illustrated, as the gain of the repeater increases, the BTS receiver RSSI ($P_{in}$) increases even without the presence of a mobile or UE signal within the repeater or DAS cell. Similarly, for different loading of the BTS and constant gain of the repeater or DAS, the curves of FIG. 4 illustrate an overall increase in the power into the BTS receiver, as reflected by an increased RSSI due to the multitude of received signals from active mobiles in the BTS cell which represent interference for the next considered mobile.

However, for the power received from one mobile or UE by the repeater or DAS system (RSSI), that measured value ($P_{in}$) will increase as the repeater uplink gain is reduced, as shown in FIG. 6. That is, when the repeater gain is reduced, the RSSI of the mobile or UE within the repeater cell received via DAS or repeater at the base station 12 is reduced and the base station orders the UE devices to increase their transmit power. This results in an overall increase in RSSI ($P_{in}$) received in the UL path of the repeater or DAS remote unit, as shown in FIG. 6. Also illustrated in FIG. 6 is the increased power associated with the loading at the base station. In the graph of FIG. 6, the increase of the measured RSSI level based on decreased repeater gain would generally only be noticeable in those cases where there are active UE devices in the repeating system cell. The inverse relationship between the measured input power at the uplink path of the receiver and the repeater gain is reflected by Equation 1:

$$P_{in,rep} = \frac{n \cdot [S/(N+I)]_{req} \cdot (N_{BTS} + I_{traffic})}{G \cdot PL_{donor}} + (n \cdot [S/(N+I)]_{req} + 1) \cdot N_{rep}$$

$[S/(N+I)]_{req}$ Signal-to-Noise ratio for mobile/UE required at BTS input (linear value)

n Amount of mobiles in the repeater cell (linear value, assuming that each mobile arrives at the same power level at the repeater input due to BTS power control mechanisms)

$N_{BTS}$ Equivalent input noise of the BTS (linear value in Watt)

$I_{traffic}$ Factor representing the sum of other mobiles/UEs representing the BTS load (linear value in Watt)

$N_{rep}$ Equivalent input noise of repeater (linear value in Watt)

G: Repeater gain (linear value)

$PL_{donor}$ Path Loss Repeater to/from BTS (linear value)

$P_{in,rep}$ Measured Input power at the Repeater UL Input in the Presence of at least one mobile/UE in the Repeater Cell (linear value in Watt)

The above formula shows that the measured input power from one (n=1) mobile/UE in the repeater cell goes up if the repeater gain is reduced.

$N_{total,BTS}$: Total input noise of BTS (linear value in Watt)

$$N_{total,BTS} = N_{BTS} + I_{traffic} + N_{rep} \cdot G \cdot PL_{donor}$$

The above formula calculates the total input noise at the base station including the equivalent input noise due to the noise figure of the BTS, the input power due to the other mobile acting as interference, and the received output noise from the repeater. The output noise from the repeater is calculated from the equivalent input noise due to the repeater noise figure multiplied by the repeater gain and reduced due to the path loss from the repeater to the BTS. In the following graphs the count of mobiles in the repeater cell is one.

The change of the cross-correlation peak over time at a constant amplitude of the gain change waveform will give an indicator of changing mobile traffic through the repeater. This is based upon the assumption that the slope of the curve of FIG. 6 remains approximately the same with different loading on the BTS. This is the case for lower repeater gain numbers. As the cross-correlation peak is dominated by the dynamic nature of the RSSI that is related to the repeater or DAS UL gain change the height of the peak is a good indication of the mobile or UE traffic through the repeater.

In accordance with an aspect of the invention, the BTS traffic and loading is taken into account. To that end, as illustrated in FIGS. 3, 3A, a modem or mobile device 110 is coupled to the donor antenna of the repeater or the closest possible point to the donor base station. Device 110 provides a measurement of the transmit power that is required from the mobile or UE device by the base station. The measured required transmit power may then be utilized by DSP 72 or other circuitry 100 of system 50, and any increase of the required mobile transmit power measured with device 110 would be due to increased loading on the BTS 12. This feature of the invention requires generally two conditions. First, the path loss to repeater system 50 must be determined very accurately through the downlink pilot (DL) signal measurement. Typically, the downlink and uplink frequencies are relatively close to each other so that the path loss changes in the downlink resulting from different propagation conditions should represent the expected changes for the uplink path as well, provided that the equalizer in both the uplink and downlink directions works similarly to reduce the impact of any multi-path propagation. Secondly, the BTS signal degradation that is related to the repeater system must not change significantly over time. This would generally be the case if the uplink gain is controlled by the downlink received pilot signal strength, assuming a constant noise figure for the repeater. As such, the measurement provided by device 110 at the donor antenna of the repeater provides an indication of an increased loading on the BTS, and may be used by DSP 72 to affect the detection of traffic and the amount of traffic.

Accordingly, the invention provides a method to determine the presence of uplink traffic in a repeater or DAS system over time. Although it is difficult to determine the amount of active mobiles handled by the repeater system at a given time, the present invention provides the ability to measure the presence of uplink traffic over time and to determine the percentage of mobile traffic within a specific time interval. From this percentage of mobile traffic, a repeater cell loading can be determined because the likelihood of two mobile device always transmitting at the same time is relatively low. The relative loading determined by the present invention allows the determination of heavy or light loading for that repeater system cell. As noted above, if heavy loading is determined over a longer time interval, the owner of the signal repeating system, such as the owner of a building having a repeater or DAS, will have an indication that a dedicated BTS installation might be required to increase the amount of capacity offered in the area of interest.

In accordance with another aspect of the invention, the detection and processing circuitry may take into account the overall BTS traffic to adjust the measurement by looking at all of the various cross-correlation peaks over time. The DSP monitors the detected peak or peaks, and, if a lower peak or a smaller area under the peak, or a small number of peaks are detected, the system will indicate a lower level of repeater traffic. As noted above, the invention might yield only a single peak in the correlation. For higher levels of traffic, the peak might be higher or wider, and might consist of multiple individual peaks that overlap. The individual peaks will be caused by individual mobiles that are slightly different in their transmit power adjustment following the BTS and system command to increase transmit power. The adjustment in power might have a different offset for each individual step and mobile so that the peak width and amplitude might vary over time. It is expected that, for a constant amount of active mobile devices, the area below the peak will stay the same. However, if a large number of peaks are detected, but at lower peak levels, higher traffic is indicated. As such, the number of peaks is utilized by the invention, rather than the peak levels to determine whether a high traffic or low traffic condition exists. The signal repeating system of the invention may provide indications through user outputs, such as screens or displays 112 regarding the detected traffic and the level thereof.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A signal repeating system for a wireless network comprising:
   at least one first antenna configured for transceiving signals with at least one user equipment device;
   repeating circuitry coupled to the at least one first antenna and defining an uplink path for signals from the user equipment device back to a base station, the repeating circuitry including circuitry for varying the level of signals handled in the uplink path;
   control circuitry in the repeating circuitry that is operable to control how the level of signals in the uplink path are varied;
   measurement circuitry for measuring, over time, the receive power in the uplink path in a particular frequency band where traffic is expected from the at least one user equipment device;
   processing circuitry configured for comparing a signal associated with the uplink path level variation with the measured receive power and for determining if a variation in the uplink path signal level causes a change in the measured receive power in order to detect the existence of traffic from user equipment devices in the uplink path.

2. The signal repeating system of claim 1 wherein the repeating circuitry has gain circuitry for varying the gain of signals handled in the uplink path, the control circuitry being operable for varying the gain of the repeating circuitry according to a waveform.

3. The signal repeating system of claim 2 wherein the control circuitry is further operable for varying an average gain of the gain circuitry.

4. The signal repeating system of claim 1 wherein the processing circuitry evaluates at least one peak resulting from the comparison of the signal associated with the uplink path level variation and the measured receive power for determining the existence of traffic from user equipment devices in the uplink path.

5. The signal repeating system of claim 1 further comprising a device operable for measuring a transmit power required from the at least one user equipment device by the base station for transceiving signals with the base station, the processing circuitry evaluating the transmit power measurement, along with results of the comparison of the signal associated with the uplink path level variation and the measured receive power, for determining the existence of traffic from user equipment devices in the uplink path.

6. The signal repeating system of claim 1 wherein the variation of the level of signals handled in the uplink path is synchronized with a parameter of the wireless network.

7. The signal repeating system of claim 1 wherein the variation of the level of signals handled in the uplink path is aligned, in at least one of phase or frequency, with a standard of the wireless network.

8. The signal repeating system of claim 1 wherein the circuitry for varying the level of signals handled in the uplink path has multiple stages, the control circuitry coupled in the repeating circuitry at a stage in the uplink path spaced from the antenna.

9. The signal repeating system of claim 1 further comprising at least one of a second antenna or a wire media link coupled with the repeating circuitry and operable for communicating with a base station.

10. The signal repeating system of claim 9 further comprising a master unit configured for communicating with the base station, a wire media link coupling the repeating circuitry with the master unit.

11. A distributed antenna system for a wireless network comprising:
   a master unit configured for communicating with a base station;
   at least one remote unit;
   wire media link coupling the at least one remote unit and master unit;
   the at least one remote unit including:
   at least one antenna configured for transceiving signals with at least one user equipment device;
   repeating circuitry coupled between the at least one antenna and defining an uplink path for signals from the user equipment device to a base station, the repeating circuitry including circuitry for varying the level of signals handled in the uplink path;
   control circuitry in the repeating circuitry that is operable to control how the level of signals in the uplink path are varied;
   measurement circuitry for measuring, over time, the receive power in the uplink path in a particular frequency band where traffic is expected from the at least one user equipment device;

processing circuitry configured for comparing a signal associated with the uplink path level variation with the measured receive power and for determining if a variation in the uplink path signal level causes a change in the measured receive power in order to detect the existence of traffic from user equipment devices in the uplink path.

12. A method for determining the existence of traffic in a signal repeating system for a wireless network, the method comprising:
   transceiving signals between a base station and at least one user equipment device through a signal repeating system having an uplink path for signals from the user equipment device to the base station;
   varying the level of signals handled in the uplink path;
   measuring, over time, the receive power in the uplink path in a particular frequency where traffic is expected from the at least one user equipment device;
   comparing a signal associated with the uplink path level variation with the measured receive power and determining if a variation in the uplink path signal level causes a change in the measured receive power in order to detect the existence of traffic from user equipment devices in the uplink path.

13. The method of claim 12 further comprising varying the gain of signals handled in the uplink path and varying the gain according to a waveform.

14. The method of claim 13 further comprising comparing the signal associated with the uplink path level variation with the measured receive power to provide multiple curves and averaging the multiple curves.

15. The method of claim 13 further comprising varying an average gain of the signals handled in the uplink path in addition to varying the gain according to a waveform.

16. The method of claim 12 further comprising evaluating at least one peak resulting from the comparison of the signal associated with the uplink path level variation and the measured receive power for determining the existence of traffic from user equipment devices in the uplink path.

17. The method of claim 12 further comprising measuring a transmit power required from the at least one user equipment device by the base station for transceiving signals with the base station and evaluating the transmit power measurement, along with results of the comparison of the signal associated with the uplink path level variation and the measured receive power, for determining the existence of traffic from user equipment devices in the uplink path.

18. The method of claim 12 further comprising synchronizing the variation of the level of signals handled in the uplink path with a parameter of the wireless network.

19. The method of claim 12 further comprising aligning the variation of the level of signals handled in the uplink path, in at least one of phase or frequency, with a standard of the wireless network.

20. The method of claim 12 further comprising varying the level of signals handled in the signal path at a stage in the uplink path that is spaced from an input to the uplink path.

* * * * *